United States Patent
Wei et al.

(10) Patent No.: US 10,171,753 B2
(45) Date of Patent: Jan. 1, 2019

(54) SHOOTING METHOD, SHOOTING DEVICE AND COMPUTER STORAGE MEDIUM

(71) Applicant: NUBIA TECHNOLOGY CO., LTD., Shenzhen, Guangdong (CN)

(72) Inventors: Qiang Wei, Shenzhen (CN); Linwen Liu, Shenzhen (CN); Qiang Li, Shenzhen (CN); Lei Miao, Shenzhen (CN)

(73) Assignee: NUBIA TECHNOLOGY CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/505,964

(22) PCT Filed: Jul. 10, 2015

(86) PCT No.: PCT/CN2015/083728
§ 371 (c)(1),
(2) Date: Feb. 23, 2017

(87) PCT Pub. No.: WO2016/029746
PCT Pub. Date: Mar. 3, 2016

(65) Prior Publication Data
US 2017/0280064 A1    Sep. 28, 2017

(30) Foreign Application Priority Data
Aug. 28, 2014 (CN) .......................... 2014 1 0431341

(51) Int. Cl.
*H04N 5/265* (2006.01)
*H04N 5/232* (2006.01)
*H04N 5/235* (2006.01)

(52) U.S. Cl.
CPC ............. *H04N 5/265* (2013.01); *H04N 5/232* (2013.01); *H04N 5/235* (2013.01)

(58) Field of Classification Search
CPC ......... H04N 5/265; H04N 5/235; H04N 5/232
(Continued)

(56) References Cited

U.S. PATENT DOCUMENTS

| 6,658,163 | B1 * | 12/2003 | Takaoka | .............. H04N 1/6027 382/190 |
| 2013/0129221 | A1 | 5/2013 | Nakao | |
| 2015/0334283 | A1 * | 11/2015 | Vranceanu | .............. G06T 5/003 348/239 |

FOREIGN PATENT DOCUMENTS

| CN | 102831439 A | 12/2012 |
| CN | 103124325 A | 5/2013 |

(Continued)

OTHER PUBLICATIONS

International Search Report in international application No. PCT/CN2015/083728, dated Aug. 21, 2015.
(Continued)

*Primary Examiner* — Yogesh K Aggarwal
(74) *Attorney, Agent, or Firm* — Arent Fox LLP

(57) ABSTRACT

A shooting method, a shooting device and a computer storage medium. The shooting method comprises: continuously collecting images; reading the collected images and identifying a light painting region in the currently read image; extracting the light painting region and superposing the light painting region on a foundation image at a corresponding position to perform image synthesis and generate a synthesized image, and using the synthesized image as the foundation image for the next time of image synthesis; capturing the synthesized image and performing coding processing on the captured synthesized image; and converting image data after the coding processing into video file after the shooting is completed.

13 Claims, 4 Drawing Sheets

(58) Field of Classification Search
USPC .............................. 348/222.1–229.1, 362–365
See application file for complete search history.

(56) References Cited

FOREIGN PATENT DOCUMENTS

| | | |
|---|---|---|
| CN | 104202521 A | 5/2013 |
| CN | 103595925 A | 2/2014 |
| CN | 103888683 A | 6/2014 |
| CN | 103973984 A | 8/2014 |
| CN | 104159040 A | 8/2014 |
| JP | 2005323411 A | 11/2005 |

OTHER PUBLICATIONS

English Translation of the Written Opinion of the International Search Authority in international application No. PCT/CN2015/083728, dated Aug. 21, 2015.

* cited by examiner

SHOOTING METHOD, SHOOTING DEVICE AND COMPUTER STORAGE MEDIUM

CROSS-REFERENCE TO RELATED APPLICATIONS

This application is a US National Stage of International Application No. PCT/CN2015/083728 filed on Jul. 10, 2015, designating the United States and claiming the priority to Chinese Patent Application No. 201410431341.4 filed on Aug. 28, 2014, the contents of which are hereby incorporated by reference in their entirety.

TECHNICAL FIELD

The disclosure relates to the field of photography technology, and in particular to a shooting method, a shooting apparatus and a computer storage medium.

BACKGROUND

Recently, a shooting mode of light-painting photography emerges, and a user may create art works using the light-painting photography. The light-painting photography refers to a shooting mode of performing long-term exposure and creating a special image by means of the change of a light source during the exposure. Since the long-term exposure is needed, corresponding photosensitive hardware is needed to support the long-term exposure. The photosensitive hardware capable of supporting the long-term exposure is relatively expensive, so only a professional photography apparatus such as a single lens reflex camera is equipped with the photosensitive hardware, and a digital shooting apparatus such as a digital shooting apparatus and a mobile phone cannot be equipped with such expensive hardware device.

In order to achieve light-painting photography in the digital shooting apparatus, a solution is provided in the conventional art. In the solution, image data is successively collected by means of a camera, and an addition operation is performed on current image data and previous image data to generate a composite image. Thus, the shooting apparatus performs the long-term exposure without the photosensitive hardware, and simulates the long-term exposure by using an image superimposition and composition technology instead. A light-painting shooting function is achieved on the digital shooting apparatus.

However, since the light-painting photography is characterized by superposing all bright spots in a shooting environment, a light-painting trail is recorded in a finally obtained image. Therefore, regardless of a professional shooting apparatus or the digital shooting apparatus, the light-painting photography may be performed only in a dark shooting environment. If the light-painting photography is performed in a bright shooting environment, in addition to the light-painting bright spots formed in the finally obtained image, a great number of other bright spots may be formed so as to pollute the image, so a clear light-painting trail cannot be obtained. Meanwhile, a traditional single lens reflex camera is only capable of shooting a picture. That is, only a static image for displaying final light-painting works is finally obtained, and a dynamic video capable of displaying a creation process of the light-painting works cannot be shot.

Therefore, the conventional shooting apparatus is only capable of performing light-painting photography in a dark shooting environment (for example, at night), cannot perform light-painting photography in a bright shooting environment (for example, in the daytime), and cannot meet demands of a user for light-painting creation anytime and anywhere. Moreover, a solution for achieving shooting of a light-painting video does not exist in the conventional art yet, diversified demands of the user cannot be met, and the user experience is deteriorated.

SUMMARY

A main objective of the embodiments of the disclosure is to provide a shooting method, a shooting apparatus and a computer storage medium, capable of achieving shooting of a light-painting video in a bright shooting environment, thereby meeting demands of a user for light-painting creation anytime and anywhere, and improving the user experience.

To this end, an embodiment of the disclosure provides a shooting method, which may include the steps as follows:
images are successively collected;
the collected images are read, and a light-painting area in the read current image is identified;
the light-painting area is extracted and superposed on a corresponding position of a basic image for performing image composition, so as to generate a composite image, and the composite image is taken as a basic image for next image composition;
the composite image is captured, and the captured composite image is encoded; and
when shooting is ended, a video file is generated by using data of the encoded images.

Optionally, the step that the light-painting area in the read current image is identified may include the steps as follows:
the read current image is searched for an auxiliary target matching pre-stored features; and
a bright spot area at a preset position of the auxiliary target is identified as the light-painting area.

Optionally, the step that the light-painting area in the read current image is identified may include the steps as follows:
the position of a light-painting area in a read previous image is acquired; and
a preset range of a corresponding position in the read current image is searched for light-painting bright spots matching the pre-stored features, and an area where the light-painting bright spots are located is identified as the light-painting area.

Optionally, the method may further include the step as follows: if the read current image is a first collected image, the image is directly taken as a basic image for next image composition or a preset background image is taken as a basic image for current image composition.

Optionally, before the captured composite image is encoded, the method may further include the step as follows:
the captured composite image is processed by using special effects including basic effect, filter effect and/or special scenario effect.

An embodiment of the disclosure also provides a shooting apparatus, which may include an image collection module, an image composition module and a video generation module, wherein
the image collection module is configured to successively collect data of images;
the image composition module is configured to: read collected images, search the read current image according to pre-stored features, and identify a light-painting area in the read current image; and extract the light-painting area, superpose the light-painting area on a corresponding position of a basic image for performing image composition so as to generate a composite image, and take the composite image as a basic image for next image composition; and the video generation module is configured to capture the composite image, encode the captured composite image, and generate a video file by using data of the encoded images.

Optionally, the image composition module may be further configured to: search the read current image for an auxiliary target matching the preset features, and identify a bright spot area at a preset position of the auxiliary target as the light-painting area.

Optionally, the image composition module may be further configured to: acquire the position of a light-painting area in a read previous image; and search a preset range of a corresponding position in the read current image for light-painting bright spots matching the pre-stored features, and identify an area where the light-painting bright spots are located as the light-painting area.

Optionally, the image composition module may be further configured to: directly take, if the read current image is a first collected image, the image as a basic image for next image composition, or take a preset background image as a basic image for current image composition.

Optionally, the shooting apparatus may further include a special effect processing module. The special effect processing module may be configured to: process the captured composite image by using special effects including basic effect, filter effect and/or special scenario effect.

An embodiment of the disclosure also provides a computer storage medium having stored a computer program for executing the above shooting method.

In the technical solution of the embodiments of the disclosure, an auxiliary target itself or light-painting bright spots themselves are tracked, a light-painting area in an image is identified according to the auxiliary target or the light-painting bright spots, and the light-painting area is finally extracted for superimposition and composition so as to generate a composite image. Since superimposition and composition is performed on only the light-painting area, other bright spot areas in the image will not appear in the composite image, and the composite image will not be polluted. Therefore, a clear light-painting trail can be recorded in the final composite image, light-painting photography in a bright shooting environment is achieved, and a light-painting picture is obtained. Light-painting pictures of different moments are encoded, and a video file is finally composited, thereby achieving shooting of a light-painting video in the bright environment. The application scenario of light-painting photography is expanded, and demands of a user for light-painting creation anytime and anywhere are met. The user may shoot a video displaying a creation process of light-painting works by using a shooting apparatus, or the disclosure is applied to similar application scenarios, diversified demands of the user are met, and the user experience is improved.

Meanwhile, since shooting and composite image encoding are performed at the same time, it is not necessary to store a generated composite image. Therefore, the size of a final shot video file will not be very large, and the occupied storage space will not be too big.

The implementation of the aim, functional features and advantages of the disclosure will be further illustrated with reference to the drawings in conjunction with embodiments.

DETAILED DESCRIPTION

It will be understood that specific embodiments described herein are only intended to explain the disclosure and are not intended to limit the disclosure.

A shooting method according to an embodiment of the disclosure is mainly applied to light-painting photography, and can also be applied to an application scenario similar to the light-painting photography, which will not be limited herein. The following embodiments are illustrated in detail by taking the light-painting photography as an example.

The shooting method according to the embodiment of the disclosure achieves shooting of a light-painting video in a bright environment by means of the steps as follows. Images are successively collected. The collected images are read, the read current image is searched according to pre-stored features, to identify a light-painting area in the read current image. The light-painting area is extracted and superposed on a corresponding position of a basic image for performing image composition, so as to generate a composite image, and the composite image is taken as a basic image for next image composition. The composite image is captured, and the captured composite image is encoded. When shooting is ended, a video file is generated by using data of the encoded images.

Detailed illustrations are made below by means of specific embodiments.

Figure 1:
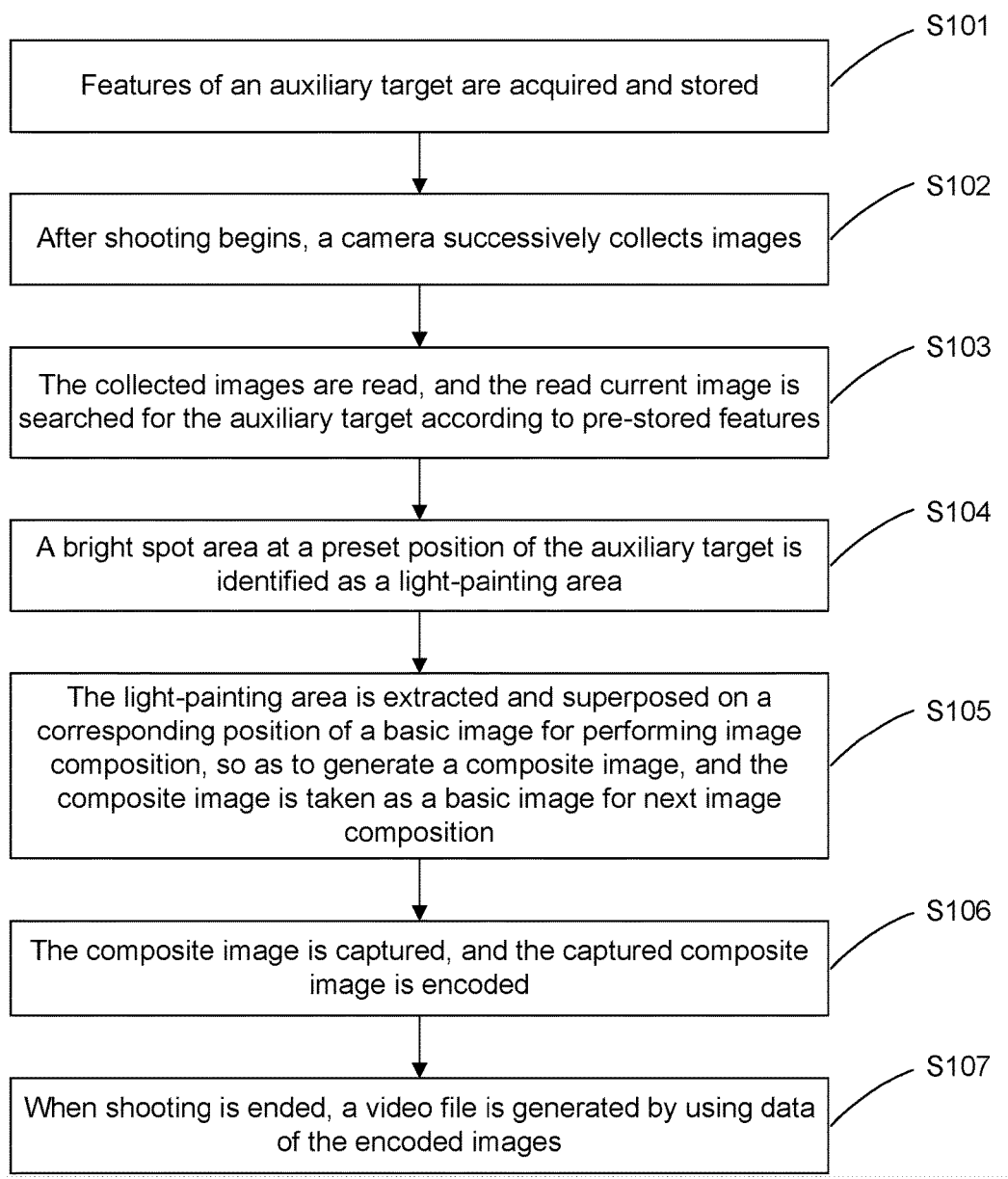
FIG. 1 is a flowchart of a first embodiment for a shooting method according to the disclosure.

Referring to FIG. 1, a first embodiment for a shooting method according to the disclosure is provided. The shooting method includes the steps as follows.

In Step S101, features of an auxiliary target are acquired and stored before shooting begins, a shooting apparatus may directly acquire existing feature data from the outside, or may prompt a user to select an auxiliary target on a preview interface, extract feature data of the auxiliary target selected by the user and store the feature data.

It is advantageous that the auxiliary target has significant features, so as to make it convenient for the shooting apparatus to track the auxiliary target according to feature parameters in a subsequent shooting process. The auxiliary target may be a light-painting pen, a hand or combination of both. The light-painting pen may be any luminous object.

In Step S102, after shooting begins, a camera successively collects images.

When the user selects a light-painting photography mode, after a shooting key is pressed down or a virtual shooting key is triggered, the shooting apparatus begins to perform light-painting shooting, and successively collects the images by using the camera. The speed at which the images are collected successively by the camera may be preset.

In Step S103, the collected images are read, and the read current image is searched for the auxiliary target according to the pre-stored features.

The shooting apparatus reads the collected images successively or at intervals, and searches the read current image for the auxiliary target matching the pre-stored features, so as to achieve tracking of the auxiliary target.

In Step S104, a bright spot area at a preset position of the auxiliary target is identified as a light-painting area.

Specifically, when the auxiliary target is the light-painting pen, the shooting apparatus searches a luminous position at the top end of the light-painting pen for the bright spot area (an area having luminance greater than a preset value), and identifies the found bright spot area as the light-painting area.

In Step S105, the light-painting area is extracted and superposed on a corresponding position of a basic image for performing image composition, so as to generate a composite image, and the composite image is taken as a basic image for next image composition.

Specifically, the shooting apparatus acquires a coordinate position of the light-painting area in an original image, extracts the light-painting area, then superposes the light-painting area on a corresponding coordinate position in the basic image, and composites the light-painting area into the basic image so as to generate the composite image.

Optionally, if the read current image is a first collected image, the image is directly taken as a basic image for next image composition, and the background of a final composite image is the background of a shooting site.

Alternatively, the user is allowed to preset a background image. The background image may be selected from existing pictures, or may be obtained by shooting a picture on the site. If the read current image is the first collected image, a preset background image is taken as a basic image for current image composition, a light-painting area of the first image is extracted and superposed on a corresponding position of the preset background image, such that any background may be set for the composite image.

After completing image composition once by an image composition thread, the process returns to Step S103, the collected images are continuously read for next image composition, and that cycle repeats. Image collection and image composition are performed at the same time. Since the camera successively collects the images, composite images are also successively generated in real time.

In Step S106, the composite image is captured, and the captured composite image is encoded.

Specifically, the shooting apparatus may capture composite images successively or at intervals. Successive capturing is preferred in the present embodiment. That is, once each of the composite images is generated, the composite image is captured and encoded, and all of the generated composite images are taken as materials for video composition. Generation of a composite image and capturing of a composite image for encoding are two threads which are simultaneously performed. Since shooting and encoding of a composite image are performed at the same time, the generated composite images do not need to be stored.

In Step S107, when shooting is ended, a video file is generated by using data of the encoded images.

A format of the generated video file may be specified by the user. The format of the video file includes, but is not limited to, mp4, 3gp, avi, rmvb or the like.

Preferably, in a shooting process, the shooting apparatus further displays a composite image on a display screen in real time to allow the user to preview a current light-painting effect in real time. In order to achieve a smooth preview effect, the composite image displayed by the shooting apparatus is a compressed thumbnail with a small size.

Thus, an auxiliary target is tracked, a light-painting area in an image is identified according to the auxiliary target, and the light-painting area is extracted for superimposition and composition. Since superimposition and composition is performed on only the light-painting area, other bright spot areas in the image will not appear in a composite image, and the composite image will not be polluted. Therefore, a clear light-painting trail can be recorded in a final composite image, and a light-painting picture can be shot in a bright shooting environment. Light-painting pictures of different moments are encoded, and a video file is finally composited, thereby achieving shooting of a light-painting video in the bright environment. The user may shoot a video displaying a creation process of light-painting works using a shooting apparatus, or the disclosure is applied to similar application scenarios, diversified demands of the user are met, and the user experience is improved. Meanwhile, since the shooting and the encoding of the composite image are performed at the same time, it is not necessary to store the generated composite image. Therefore, the size of a final shot video file will not be very large, and the occupied storage space will not be too big.

Figure 2:
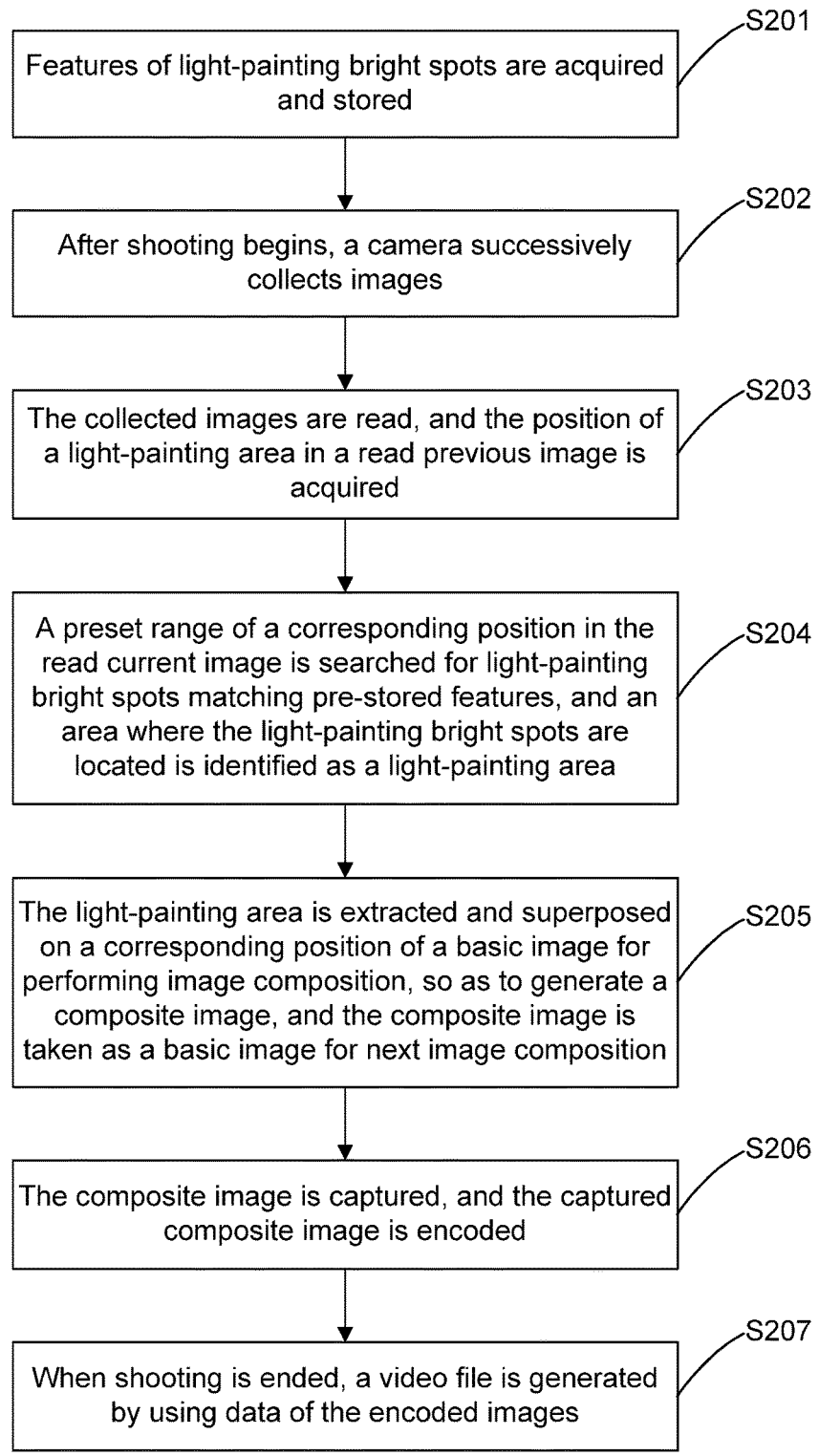
FIG. 2 is a flowchart of a second embodiment for a shooting method according to the disclosure.

Referring to FIG. 2, a second embodiment for a shooting method according to the disclosure is provided. The shooting method includes the steps as follows.

In Step S201, features of light-painting bright spots are acquired and stored.

Before shooting begins, a shooting apparatus may directly acquire existing feature data from the outside, or may prompt a user to select light-painting bright spots on a preview interface, extract feature data of the light-painting bright spots selected by the user and store the feature data. The features of the light-painting bright spots include luminance, area, profile, diameter and the like of bright spots. The light-painting bright spots are bright spots formed by the light emitted from a light-painting pen.

In the present embodiment, the features of the light-painting bright spots are pre-stored, in order to directly track the light-painting bright spots subsequently.

In Step S202, after shooting begins, a camera successively collects images.

In Step S203, the collected images are read, and the position of a light-painting area in a read previous image is acquired.

The shooting apparatus may cache the position (for example, position coordinates) of a light-painting area in the read current image during each image composition, in order that the position of the light-painting area in the read previous image may be directly acquired from a cache during next image composition.

Alternatively, the shooting apparatus may take the position of the end of a light-painting trail in a basic image as the position of the light-painting area in the read previous image.

When the read image is a first collected image, the position may be specified by the user, or a preset position may be read.

In Step S204, a preset range of a corresponding position in the read current image is searched for light-painting bright spots matching pre-stored features, and an area where the light-painting areas are located is identified as a light-painting area.

During light-painting creation, a moving trail of the light-painting bright spots is regular and continuous, so light-painting bright spots in two adjacent collected images are adjacent, and cannot be far away from each other. Therefore, when tracks the light-painting bright spots are tracked in the present embodiment, only a preset range of the position of a light-painting area in a previous image is searched, thereby avoiding misjudging of bright spots of other areas as light-painting bright spots.

In Step S205, the light-painting area is extracted and superposed on a corresponding position of a basic image for performing image composition, so as to generate a composite image, and the composite image is taken as a basic image for next image composition.

In Step S206, the composite image is captured, and the captured composite image is encoded.

In Step S207, when shooting is ended, a video file is generated by using data of the encoded images.

Thus, light-painting bright spots are directly tracked, a light-painting area in an image is identified according to the light-painting bright spots, and the light-painting area is extracted for superimposition and composition. Since superimposition and composition is performed on only the light-painting area, other bright spot areas in the image will not appear in a composite image, and the composite image will not be polluted. Therefore, a clear light-painting trail can be recorded in the final composite image, and a light-painting picture can be shot in a bright shooting environment.

Figure 3:
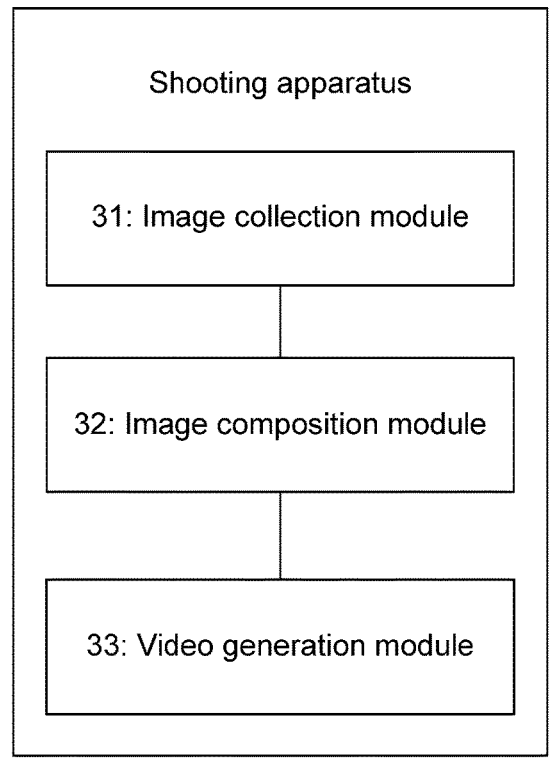
FIG. 3 is a schematic view of modules of a first embodiment for a shooting apparatus according to the disclosure.

Referring to FIG. 3, one embodiment for a shooting apparatus according to the disclosure is provided. The shooting apparatus may be a common digital camera such as a card camera, or may be a terminal device, such as a mobile phone and a tablet computer, having a photographic function. The shooting apparatus is a shooting apparatus for implementing the shooting method, and includes an image collection module 31, an image composition module 32 and a video generation module 33.

The image collection module 31 is configured to collect an image by using a camera.

When a user selects a light-painting photography mode, after a shooting key is pressed down or a virtual shooting key is triggered, the shooting apparatus begins to perform light-painting shooting, and the image collection module 31 successively collects images using the camera. The speed of successively collecting the images by the camera may be preset.

The image composition module 32 is configured to: read the collected images successively or at intervals, search the read current image according to pre-stored features, and identify a light-painting area in the read current image; and extract the light-painting area, superpose the light-painting area on a corresponding position of a basic image for performing image composition so as to generate a composite image, and take the composite image as a basic image for next image composition In some embodiments, the image composition module 32 may identify light-painting areas in the images by tracking an auxiliary target.

Specifically, before shooting beings, the shooting apparatus may directly acquire existing feature data of an auxiliary target from the outside, or may prompt the user to select an auxiliary target on a preview interface, extract the feature data of the auxiliary target selected by the user and store the feature data. It is advantageous that the auxiliary target has significant features, so as to make it convenient for the shooting apparatus to track the auxiliary target according to feature parameters in a subsequent shooting process. The auxiliary target may be a light-painting pen, a hand or combination of both. The light-painting pen may be any luminous object. The image composition module 32 reads the collected images, searches the read current image for the auxiliary target matching pre-stored features, and identifies a bright spot area at a preset position of the auxiliary target as a light-painting area. For example, when the auxiliary target is the light-painting pen, the image composition module 32 searches a luminous position at the top end of the light-painting pen for the bright spot area (an area having luminance greater than a preset value), and identifies the found bright spot area as the light-painting area.

In some other embodiments, the image composition module 32 identifies the light-painting areas in the images by directly tracking the light-painting bright spots themselves.

Specifically, before shooting begins, the shooting apparatus may directly acquire existing feature data of light-painting bright spots from the outside, or may prompt the user to select light-painting bright spots on the preview interface, extract the feature data of the light-painting bright spots selected by the user and store the feature data. The features of the light-painting bright spots include luminance, area, profile, diameter and the like of bright spots. The image composition module 32 reads the collected images, acquires the position of a light-painting area in a read previous image, searches a preset range of a corresponding position in the read current image for light-painting bright spots matching the pre-stored features, and identifies an area where the light-painting areas are located as the light-painting area. Optionally, the image composition module 32 may cache the position of a light-painting area in the read current image during each image composition, in order that the position of the light-painting area in the read previous image may be directly acquired from a cache during next image composition. Alternatively, the image composition module 32 may take the position of the end of a light-painting trail in a basic image as the position of the light-painting area in the read previous image.

During image composition, the image composition module 32 acquires a coordinate position of a light-painting area in an original image, extracts the light-painting area, then superposes the light-painting area on a corresponding coordinate position in the basic image, and composites the light-painting area in the basic image so as to generate a composite image. Optionally, if the read current image is a first collected image, the image is directly taken as a basic image for next image composition, and the background of a final composite image is the background of a shooting site. Alternatively, the user is allowed to preset a background image. The background image may be selected from existing pictures, or may be obtained by shooting a picture on the site. If the read current image is the first collected image, a preset background image is taken as a basic image for current image composition, a light-painting area of the first image is extracted and superposed on a corresponding position of the preset background image, such that any background may be set for the composite image.

After completing image composition once, the current composite image may be displayed in real time by means of a display screen. Meanwhile, the collected images are continuously read for next image composition, and that cycle repeats until shooting is ended. Image collection and image composition are performed at the same time. Since the camera successively collects the images, the composite images are also successively generated in real time.

The video generation module 33 is configured to capture the composite images, encode the captured composite images, and generate a video file by using data of the encoded images.

Specifically, the video generation module 33 may capture composite images successively or at intervals. Successive capturing is preferred in the present embodiment. That is, every time the image composition module 32 generates a composite image, the video generation module 33 will capture and encode this composite image, and take all of the generated composite images as materials for video composition. Generation of a composite image and capturing of a composite image for encoding are two threads which are simultaneously performed.

The video generation module 33 processes the captured composite images into common video codes such as Moving Picture Experts Group (MPEG)-4, H264, H263, VP8 or the like, for subsequent generation of a video file. A method for encoding the composite images is the same as the conventional art, which will not be elaborated herein.

The video generation module 33 may generate a video file by using data of the encoded images according to a video file format specified by the user. The video file format includes, but is not limited to, mp4, 3gp, avi, rmvb and the like.

In practical application, each module in the shooting apparatus may be implemented by a Central Processing Unit (CPU), a Digital Signal Processor (DSP) or a Field-Programmable Gate Array (FPGA).

Figure 4:
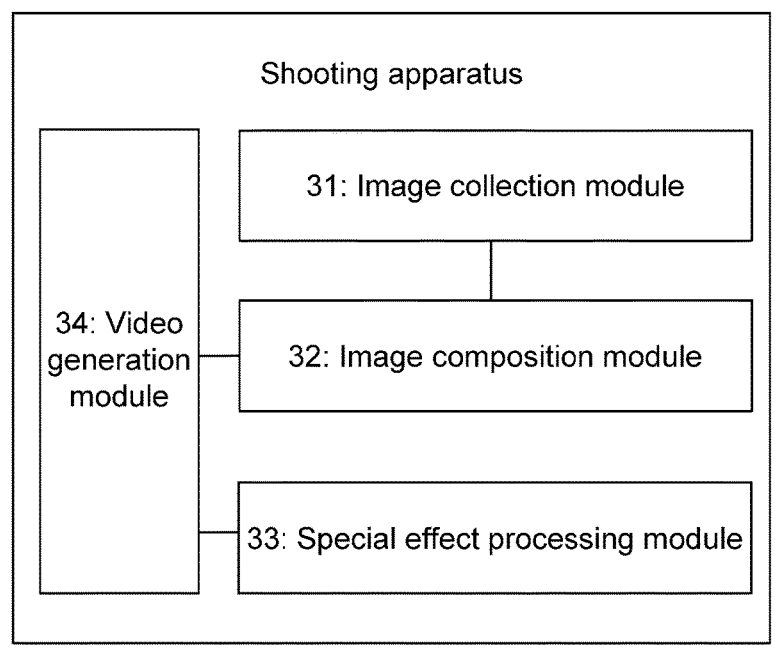
FIG. 4 is a schematic view of modules of a second embodiment for a shooting apparatus according to the disclosure.

FIG. 4 shows a second embodiment for a shooting apparatus according to the disclosure. Different from the first embodiment, in the present embodiment, there is additionally provided a special effect processing module 34, which is connected to the video generation module 33. The video generation module 33 sends the captured composite image to the special effect processing module 34. The special effect processing module 34 processes the captured composite image by using special effects, and then returns the processed composite image to the video generation module 33 for encoding.

Special effect processing includes basic effect processing, filter effect processing and/or special scenario effect processing. The basic effect processing includes noise reduction processing, luminance processing, chrominance processing and the like. The filter effect processing includes sketch processing, negative film processing, black-white processing and the like. The special scenario effect processing includes common weather processing, starry sky processing and the like.

Furthermore, the video generation module 33 is further configured to: open an audio device, and receive audio data through the audio device; and encode the audio data. There are two main sources of the audio data, namely microphone-based audio file collection or audio file customizing. When the audio source is audio file customizing, the video generation module 33 decodes an audio file to obtain original audio data. Optionally, before the audio data is encoded, the special effect processing module 34 further processes the received audio data by using special effects including special effect sound recording, sound change, tone change and/or speed change. Finally, the video generation module 33 generates a video file by using data of the encoded images and encoded audio data according to a shooting ending instruction from the user in accordance with a video file format set by the user.

Accordingly, the shooting apparatus of the disclosure tracks an auxiliary target itself or light-painting bright spots themselves, identifies a light-painting area in an image according to the auxiliary target or the light-painting bright spots, and finally extracts the light-painting area for superimposition and composition so as to generate a composite image. Since superimposition and composition is performed on only the light-painting area, other bright spot areas in the image will not appear in the composite image, and the composite image will not be polluted. Therefore, a clear light-painting trail can be recorded in the final composite image, light-painting photography in a bright shooting environment is achieved, and a light-painting picture is obtained. Light-painting pictures of different moments are encoded, and a video file is finally composited, thereby achieving shooting of a light-painting video in the bright environment. The application scenario of light-painting photography is expanded, and demands of a user for light-painting creation anytime and anywhere are met. The user may shoot a video displaying a creation process of light-painting works by using a shooting apparatus. Alternatively, the disclosure is applied to similar application scenarios, diversified demands of the user are met, and the user experience is improved.

Meanwhile, since shooting and composite image encoding are performed at the same time, it is not necessary to store the generated composite image. Therefore, the size of a final shot video file will not be very large, and the occupied storage space will not be too big.

In practical application, the respective modules in the shooting apparatus may be implemented by a CPU, a DSP or an FPGA.

It is to be noted that shooting of the shooting apparatus provided by the above embodiment is only illustrated with division of all the above functional modules. In practical application, the above functions may be allocated to different functional modules as needed. In addition, the shooting apparatus provided by the above embodiment and the embodiment for the shooting method belong to the same concept, for a specific implementation process of the shooting apparatus, please refer to the method embodiment, which will not be elaborated herein.

Those skilled in the art may understand that all or some of the steps in the above embodiment method may be implemented by controlling relevant hardware via programs, that may be stored in a computer readable storage medium such as a Read-Only Memory (ROM)/Random Access Memory (RAM), a magnetic disk, an optical disk or the like.

Figure 5:
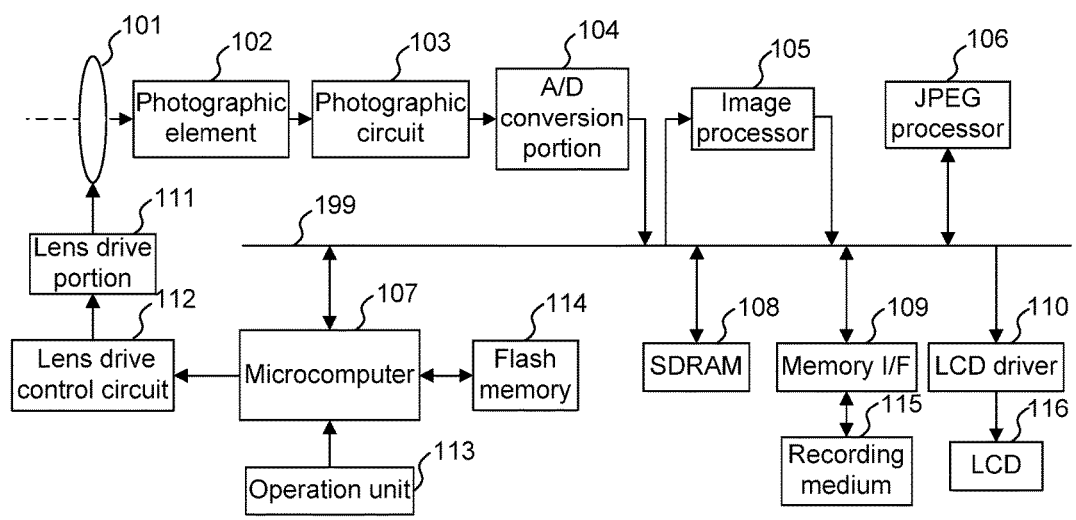
FIG. 5 is a block diagram showing a main electrical structure of a shooting apparatus according to one implementation of the disclosure.

FIG. 5 is a block diagram showing a main electrical structure of a shooting apparatus according to one implementation of the disclosure. A photographic lens 101 is composed of a plurality of optical lenses for forming an image of a photographed body. The photographic lens 101 may be a single focus lens or a zoom lens. The photographic lens 101 can move in a light axis direction by means of a lens drive portion 111. A focus position of the photographic lens 101 is controlled according to a control signal from a lens drive control portion 112. A focus distance is controlled even in case of the zoom lens. The lens drive control portion 112 performs drive control on the lens drive portion 111 according to a control command from a microcomputer 107.

A photographic element 102 is configured near a position, where the photographic lens 101 forms the image of the photographed body, on a light axis of the photographic lens 101. The photographic element 102 functions as a photographic portion for photographing the image of the photographed body and obtaining data of the photographic image. Photoelectric diodes constituting the respective pixels are configured on the photographic element 102 in a two-dimensional matrix form. Each photoelectric diode generates a photoelectric conversion current corresponding to the received quantity of the light. The charge of the photoelectric conversion current is accumulated in a capacitor connected to each photoelectric diode. A front surface of each pixel is configured with RGB colour filters in Bayer arrangement.

The photographic element 102 is connected to a photographic circuit 103. The photographic circuit 103 performs the control of the charge accumulation and the control of the image signal read-out on the photographic element 102, reduces a reset noise for a read-out image signal (i.e., analogue image signal), performs wave shaping, and then boosts a gain so as to form an appropriate signal level.

The photographic circuit 103 is connected to an Analogue-to-Digital (A/D) conversion portion 104. The A/D conversion portion 104 performs A/D conversion on the analogue image signal, and outputs a digital image signal (hereinafter referred to as image data) to a bus 199.

The bus 199 is a transmission path for transmitting various data read out or generated within the shooting apparatus. The A/D conversion portion 104 as well as an image processor 105, a Joint Photographic Experts Group (JPEG) processor 106, a microcomputer 107, a Synchronous Dynamic Random Access Memory (SDRAM) 108, a memory interface (hereinafter referred to as memory I/F) 109 and a Liquid Crystal Display (LCD) driver 110 are connected to the bus 199.

The image processor 105 performs various types of image processing such as OB subtraction processing, white balance adjustment, colour matrix operation, gamma conversion, colour difference signal processing, noise removal processing, synchronization processing and edge processing on image data which is based on output from the photographic element 102.

When recording the image data to a recording medium 115, the JPEG processor 106 compresses the image data read out from the SDRAM 108 according to a JPEG compression mode. In addition, the JPEG processor 106 decompresses JPEG image data in order to perform image reproduction display. During decompression, the file recorded in the recording medium 115 is read out. After decompression processing is performed in the JPEG processor 106, the decompressed image data is temporarily stored in the SDRAM 108 and is displayed on the LCD 116. Moreover, in this implementation, a JPEG mode is adopted as an image compression/decompression mode. However, the image compression/decompression mode is not limited thereto. Certainly, other compression/decompression modes such as a Moving Picture Experts Group (MPEG), a Tagged Image File Format (TIFF) and H.264 may be adopted.

The microcomputer 107 functions as a control portion for controlling the whole shooting apparatus, and controls various processing sequences of the shooting apparatus in a centralized manner. The microcomputer 107 is connected to an operation unit 113 and a flash memory 114.

The operation unit 113 includes, but is not limited to, physical keys or virtual keys. The physical or virtual keys may be operation members such as various input buttons and various input keys including a power button, a photographic key, an edit key, a dynamic image button, a reproduction button, a menu button, a cross key, an OK button, a deletion button and an amplification button, and operation states of these operation members are detected.

A detection result is output to the microcomputer 107. Moreover, a touch panel is disposed on a front surface of the LCD 116 serving as a display portion, a touch position of the user is detected, and the touch position is output to the microcomputer 107. The microcomputer 107 executes various processing sequences corresponding to the operation of the user according to a detection result from the operation members of the operation unit 113. (Similarly, this may be modified into a situation where the computer 107 executes various processing sequences corresponding to the operation of the user according to the detection result of the touch panel on the front surface of the LCD 116.)

The flash memory 114 stores a program for executing various processing sequences of the microcomputer 107. The microcomputer 107 controls the whole shooting apparatus according to the program. Besides, the flash memory 114 stores various adjustment values of the shooting apparatus. The microcomputer 107 reads out the adjustment values and controls the shooting apparatus according to the adjustment values.

The SDRAM 108 is an electrically-alterable volatile memory for temporarily storing image data and the like. The SDRAM 108 temporarily stores image data output from the A/D conversion portion 104 and image data processed in the image processor 105, the JPEG processor 106 and the like.

The memory I/F 109 is connected to the recording medium 115, so as to control writing of image data and data such as a file header appended to the image data into the recording medium 115 and reading of the data from the recording medium 115. The recording medium 115 is, for example, a recording medium such as a memory card capable of being freely assembled and disassembled on a shooting apparatus body. However, the recording medium 115 is not limited thereto, or may be a hard disk and the like built in the shooting apparatus body.

The LCD driver 110 is connected to the LCD 116. The image data processed by the image processor 105 is stored in the SDRAM. When displaying is needed, the image data stored in the SDRAM is read and displayed on the LCD 116. Alternatively, image data compressed by the JPEG processor 106 is stored in the SDRAM. When displaying is needed, the JPEG processor 106 reads the image data compressed by the SDRAM, decompresses the image data, and displays the decompressed image data on the LCD 116.

The LCD 116 is configured on a back surface of the shooting apparatus body and displays an image. The LCD 116 is provided with a touch panel for detecting a touch operation of the user. Moreover, as a display portion, a liquid crystal display panel (LCD 116) is configured in this implementation. However, this implementation is not limited thereto, and various display panels such as an organic EL may be adopted.

In the embodiments of the disclosure, if a service signalling tracking apparatus is implemented in a form of a software function module and is sold or used as an independent product, the product may also be stored in a computer readable storage medium. Based on this understanding, the technical solutions of the embodiments of the disclosure may be substantially embodied in a form of a software product or parts contributing to the conventional art may be embodied in a form of a software product, and the computer software product is stored in a storage medium, which includes a plurality of instructions enabling a computer device which may be a personal computer, a server, a network device or the like to execute all or some of the methods according to all embodiments of the disclosure. The storage medium includes: various medium capable of storing program codes, such as a USB driver, a mobile hard disk, a Read Only Memory (ROM), a magnetic disk, an optical disk or the like. Thus, the embodiments of the disclosure are not limited to combination of any specific hardware and software.

Correspondingly, an embodiment of the disclosure also provides a computer storage medium having stored therein a computer program for executing the shooting method according to the embodiment of the disclosure.

The preferred embodiment of the disclosure is illustrated with reference to the above drawings, and the right scope of the disclosure is not limited accordingly. Those skilled in the art may implement the disclosure using various transformed solutions without departing from the scope and essence of the disclosure. For example, the solutions serving as features of one embodiment may be applied to one embodiment to obtain another embodiment. Any modification, equivalent replacements and improvements made within the technical concept of the disclosure shall fall within the right scope of the disclosure.

What is claimed is:

1. A shooting method, comprising:
   successively collecting images;
   reading the collected images, and identifying a light-painting area in a read current image; extracting the light-painting area, superposing the light-painting area on a corresponding position of a basic image for performing image composition so as to generate a composite image, and taking the composite image as a basic image for next image composition;
   capturing the composite image, and encoding the captured composite image to obtain an encoded image; and
   generating, by using data of the encoded images, a video file when shooting is ended;
   wherein the step of identifying a light-painting area in a read current image comprises:
   acquiring a position of a light-painting area in a read previous image; and
   searching a preset range of a corresponding position in the read current image for light-painting bright spots matching the pre-stored features, and identifying an area where the light-painting bright spots are located as the light-painting area.

2. The shooting method according to claim 1, further comprising: directly taking, if the read current image is a first collected image, the image as the basic image for next image composition, or taking a preset background image as the basic image for current image composition.

3. The shooting method according to claim 1, wherein before encoding the captured composite image, the method further comprises:
   processing the captured composite image by using special effects comprising basic effect, filter effect and/or special scenario effect.

4. A shooting apparatus, comprising:
   at least one processor;
   and a memory for storing instructions executable by the processor;
   wherein the processor is configured to:
   successively collect images;
   read collected images, and identify a light-painting area in a read current image; and extract the light-painting area, superpose the light-painting area on a corresponding position of a basic image for performing image composition so as to generate a composite image, and take the composite image as a basic image for next image composition; and
   capture the composite image, encode the captured composite image, and generate a video file by using data of the encoded images;
   wherein the at least one processor is further configured to: acquire the position of a light-painting area in a read previous image; and search a preset range of a corresponding position in the read current image for light-painting bright spots matching the pre-stored features, and identify an area where the light-painting bright spots are located as the light-painting area.

5. The shooting apparatus according to claim 4, wherein the at least one processor is further configured to: directly take, if the read current image is a first collected image, the image as the basic image for next image composition, or take a preset background image as the basic image for current image composition.

6. The shooting apparatus according to claim 4, wherein the at least one processor is further configured to: process the captured composite image by using special effects comprising basic effect, filter effect and/or special scenario effect.

7. The shooting method according to claim 1, wherein capturing the composite image and encoding the captured composite image to obtain an encoded image comprises:
   capturing the composite image successively and encoding the captured composite image to obtain an encoded image; or
   capturing the composite image at intervals and encoding the captured composite image to obtain an encoded image.

8. The shooting method according to claim 7, wherein capturing the composite image successively and encoding the captured composite image to obtain an encoded image comprises:
   capturing and encoding the composite image once each composite image is generated, wherein all of the generated composite images are taken as materials of the video file.

9. The shooting method according to claim 7, wherein the method further comprises: capturing a composite image for encoding and generating the composite image are simultaneously performed.

10. The shooting apparatus according to claim 4, wherein the at least one processor is further configured to:
    capture the composite image successively and encode the captured composite image to obtain an encoded image; or
    capture the composite image at intervals and encode the captured composite image to obtain an encoded image.

11. The shooting apparatus according to claim 10, wherein the at least one processor is further configured to:
    capture and encode the composite image once each composite image is generated, wherein all of the generated composite images are taken as materials of the video file.

12. The shooting apparatus according to claim 10, wherein the at least one processor is further configured to capture a composite image for encoding and generate the composite image simultaneously.

13. A non-transitory computer-readable storage medium having stored computer executable instructions for executing the shooting method according to claim 1.

* * * * *